(12) United States Patent
Kumabe et al.

(10) Patent No.: US 10,834,551 B2
(45) Date of Patent: Nov. 10, 2020

(54) MOBILE OBJECT COMMUNICATION SYSTEM AND MOBILE OBJECT SIDE DEVICE

(71) Applicant: DENSO CORPORATION, Kariya, Aichi-pref. (JP)

(72) Inventors: Seigou Kumabe, Kariya (JP); Takahisa Yamashiro, Kariya (JP)

(73) Assignee: DENSO CORPORATION, Kariya (JP)

( * ) Notice: Subject to any disclaimer, the term of this patent is extended or adjusted under 35 U.S.C. 154(b) by 438 days.

(21) Appl. No.: 15/755,585

(22) PCT Filed: Aug. 22, 2016

(86) PCT No.: PCT/JP2016/074308
§ 371 (c)(1),
(2) Date: Feb. 27, 2018

(87) PCT Pub. No.: WO2017/038514
PCT Pub. Date: Mar. 9, 2017

(65) Prior Publication Data
US 2020/0236520 A1  Jul. 23, 2020

(30) Foreign Application Priority Data
Sep. 1, 2015  (JP) .................. 2015-172144

(51) Int. Cl.
*H04W 4/44* (2018.01)
*H04W 4/02* (2018.01)
(Continued)

(52) U.S. Cl.
CPC ............. *H04W 4/44* (2018.02); *H04W 4/023* (2013.01); *H04W 4/80* (2018.02); *H04W 48/18* (2013.01)

(58) Field of Classification Search
None
See application file for complete search history.

(56) References Cited

U.S. PATENT DOCUMENTS

| 8,462,704 B2 | 6/2013 | Hu |
| 2018/0249478 A1* | 8/2018 | Kumabe ................. H04W 4/40 |
| 2018/0263057 A1* | 9/2018 | Yamashiro ........ H04W 74/0841 |

OTHER PUBLICATIONS

"IEEE Standard for Wireless Access in Vehicular Environments (WAVE)—Networking Services", IEEE Vehicular Technology Society, IEEE Std 1609.0 2010, Dec. 30, 2010.

* cited by examiner

*Primary Examiner* — Cai Y Chen
(74) *Attorney, Agent, or Firm* — Harness, Dickey & Pierce, P.L.C.

(57) ABSTRACT

A mobile object communication system includes a mobile object side device, a service provision device performing a short range wireless communication with the mobile object side device to provide a service to the mobile object side device, and a wide area route provision unit performing a wide area communication with the mobile object side device to provide the service having the same contents as the service provided by the service provision device. The mobile object side device can perform both of the short range wireless communication and the wide area communication, and determines whether the short range wireless communication can be performed with the service provision device. When determining that the short range wireless communication cannot be performed, the service having the same contents is provided by performing the wide area communication with the wide area route provision unit.

5 Claims, 7 Drawing Sheets

(51) Int. Cl.
*H04W 4/80* (2018.01)
*H04W 48/18* (2009.01)

| MANAGEMENT NUMBER | PSID | CHANNEL | RECEPTION TIME | RECEPTION STRENGTH [dBm] | WIDE AREA COMMUNICATION INFO | ASSUMED TRAFFIC [byte] |
|---|---|---|---|---|---|---|
| 1 | 10 | SCH1 | ... | −68 | ... | 1400 |
| 2 | 20 | SCH4 | ... | −90 | ... | 300 |
| 3 | 14 | SCH5 | ... | −80 | ... | 800 |

MOBILE OBJECT COMMUNICATION SYSTEM AND MOBILE OBJECT SIDE DEVICE

CROSS REFERENCE TO RELATED APPLICATIONAPPLICATIONS

This application is a U.S. National Phase Application under 35 U.S.C. 371 of International Application No. PCT/JP2016/074308 filed on Aug. 22, 2016 and published in Japanese as WO 2017/038514 A1 on Mar. 9, 2017. This application is based on and claims the benefit of priority from Japanese Patent Application No. 2015-172144 filed on Sep. 1, 2015. The entire disclosures of all of the above applications are incorporated herein by reference.

TECHNICAL FIELD

The present disclosure relates to a mobile object communication system including a communication device managed by a service provider that provides a predetermined service to a mobile object and a mobile object side device which performs a wireless communication with the communication device. The present disclosure also relates to a mobile object side device which is employed in the mobile object communication system.

BACKGROUND ART

Up to now, a WAVE (wireless access in vehicular environments) has been known as a communication standard for performing a wireless communication directly between a communication device (hereinafter referred to as "service provision device") managed by a service provider that provides a predetermined service and a communication device (hereinafter referred to as "vehicle side device") used in a vehicle (for example, Patent Literature 1).

In the WAVE, the service provision device and the vehicle side device perform the wireless communication with the use of two types of communication channels including a control channel (hereinafter referred to as CCH: control channel) and a service channel (hereinafter referred to as SCH: service channel). The SCH is a communication channel used for transmitting and receiving information for providing the service. In the WAVE, multiple frequencies are prepared for the SCH. In other words, multiple communication channels are prepared as service channels.

In addition, the CCH is a communication channel used for distributing a message (hereinafter referred to as WSA: wave service advertisement) for initiating a communication between the vehicle side device and the service provision device with the use of the SCH, and so on. The WSA includes service type information indicating the type of services provided by the service provision device as a source of the WSA and channel information designating the SCH to be used for providing the service among the multiple SCHs.

The vehicle side device receives the WSA transmitted from the service provision device with the use of the CCH to grasp currently available services. The vehicle side device performs a communication with the service provision device with the use of the SCH indicated by the WSA distributed from the service provision device, thereby being capable of utilizing (in other words, enjoying) the service provided by the service provision device.

PRIOR ART LITERATURE

Patent Literature

Patent Literature 1: U.S. Pat. No. 8,462,704

SUMMARY OF INVENTION

It is an object of the present disclosure to provide a mobile object communication system and a mobile object side device which are capable of reducing a risk that a service provided by a service provision device is not available for the mobile object side device due to a change in a positional relationship between the mobile object side device and the service provision device. In the present disclosure, the mobile object side device is a concept including the vehicle side device described above and a mobile device carried by a pedestrian.

According to an aspect of the present disclosure, a mobile object communication system includes a mobile object side device used in a mobile object, a service provision device, and a wide area route provision unit. The service provision device performs a short range wireless communication with the mobile object side device to provide a predetermined service to the mobile object side device. The short range wireless communication adopts one of a plurality of types of service channels preliminarily allocated for provision of services by the service provision device and a control channel that is a communication channel different from all of the plurality of service channels and used for a connection control of the short range wireless communication. The predetermined service is one of the services provided by the service provision device. The wide area route provision unit provides each of the services provided by the service provision device by performing a communication through a wide area communication network in response to a request from the mobile object side device. The service provision device sequentially transmits, using the control channel, service start information that notifies each of the services provided by the service provision device. The mobile object side device includes: a mobile object side wide area communication unit that performs the communication through the wide area communication network; a mobile object side short range communication unit that performs the short range wireless communication with the service provision device and receives the service start information transmitted from the service provision device; an unprocessed service management unit that holds, as unprocessed services, one or more of the services which is not yet used among the services notified by the service start information, herein the service start information is received by the mobile object side short range communication unit; a service selection unit that selects a service to be used from the unprocessed services held by the unprocessed service management unit; and a communication availability determination unit that determines whether the short range wireless communication can be performed with the service provision device that provides the service selected by the service selection unit. When the communication availability determination unit determines that the short range wireless communication cannot be performed with the service provision device providing the service selected by the service selection unit, the mobile object side device uses the service selected by the service selection unit by controlling the mobile object side wide area communication unit to perform the communication through the wide area communication network with the wide area route provision unit.

In the above configuration, the communication availability determination unit of the mobile object side device determines whether a short range wireless communication can be performed with the service provision device that provides the service to be used from now, or not. When it is determined by the communication availability determination unit that the short range wireless communication cannot be performed with the service provision device, the mobile object side device performs the communication with the wide area route provision unit through the wide area communication network instead of the service provision device, to use a service having the same contents as that of the service provided by the service provision device.

According to such a configuration, while one service is being used, if the mobile object side device moves away from the wireless communication area of the service provision device that provides another service, the mobile object side device communicates with the wide area route provision unit through the wide area communication network, thereby being capable of using the next service.

In other words, according to the configuration described above, the risk that the service provided by the service provision device is not available for the mobile object side device due to a change in the positional relationship between the mobile object side device and the service provision device can be reduced.

According to another aspect of the present disclosure, a mobile object side device employed in a mobile object communication system is provided. The mobile object communication system includes the mobile object side device used in a mobile object, a service provision device, and a wide area route provision unit. The service provision device performs a short range wireless communication with the mobile object side device to provide a predetermined service to the mobile object side device. The short range wireless communication adopts one of a plurality of types of service channels preliminarily allocated for provision of services by the service provision device and a control channel that is a communication channel different from all of the plurality of service channels and used for a connection control of the short range wireless communication. The predetermined service is one of the services provided by the service provision device. The wide area route provision unit provides each of the services provided by the service provision device by performing a communication through a wide area communication network in response to a request from the mobile object side device. The service provision device sequentially transmits, using the control channel, service start information that notifies each of the services provided by the service provision device. The mobile object side device includes: a mobile object side wide area communication unit that performs the communication through the wide area communication network; a mobile object side short range communication unit that performs the short range wireless communication with the service provision device and receives the service start information transmitted from the service provision device; an unprocessed service management unit that holds, as unprocessed services, one or more of the services which is not yet used among the services notified by the service start information, herein the service start information is received by the mobile object side short range communication unit; a service selection unit that selects a service to be used from the unprocessed services held by the unprocessed service management unit; and a communication availability determination unit that determines whether the short range wireless communication can be performed with the service provision device that provides the service selected by the service selection unit. When the communication availability determination unit determines that the short range wireless communication cannot be performed with the service provision device providing the service selected by the service selection unit, the mobile object side device uses the service selected by the service selection unit by controlling the mobile object side wide area communication unit to perform the communication through the wide area communication network with the wide area route provision unit.

The mobile object side device according to another aspect corresponds to the mobile object side device employed in the above-described mobile object communication system. Thus, the mobile object side device according to another aspect can provide advantages similar to the advantages provided by the above-described mobile object communication system.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
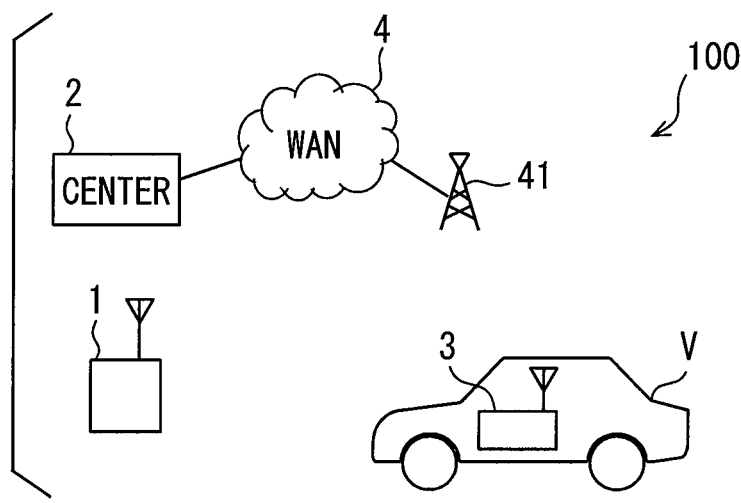
FIG. 1 is a block diagram illustrating an example of a schematic configuration of a mobile object communication system according to a first embodiment of the present disclosure.

In a system (hereinafter referred to as a mobile object communication system) in which a service provision device and a vehicle side device communicate with each other according to a WAVE standard, a situation in which plural types of services are available for the vehicle side device is supposed. For example, there are a case in which multiple service provision devices are present in the vicinity of the vehicle side device, a case in which one service provision device is compatible with plural types of services, and so on.

As described above, in a situation in which the plural types of services is available, it is preferable that the vehicle side device execute the services in order from the service with the highest priority.

However, with the movement of the vehicle, a positional relationship between the vehicle side device and the service provision device can change dynamically. Therefore, while the vehicle side device is using one service, the vehicle side device may leave the wireless communication area of the service provision device that provides another service to be used next. In the present specification, the wireless communication area means an area in which the wireless communication conforming to the WAVE can be performed.

When the vehicle side device has left the wireless communication area of the service provision device, the vehicle side device cannot naturally wirelessly communicate with the service provision device. Therefore, the service provided by the service provision device is no longer available for the vehicle side device.

In other words, conventionally, the positional relationship between the vehicle side device and the service provision device is changed while one service is being used, and the service to be used next may not be used.

In the above description, the problem arises assuming a mode in which the vehicle side device performs the communication with the service provision device according to the WAVE standard. However, a communication partner of the service provision device is not limited to the vehicle side device. A mobile device carried by a pedestrian may perform the communication with the service provision device according to the WAVE standard. Even in that case, the same problem as that of the vehicle side device arises.

The present disclosure has been made based on the above circumstance, and it is an object of the present disclosure to provide a mobile object communication system and a mobile object side device which are capable of reducing a risk that a service provided by a service provision device is not available for the mobile object side device due to a change in a positional relationship between the mobile object side device and the service provision device. In the present specification, the mobile object side device is a concept including the vehicle side device described above and a mobile device carried by a pedestrian.

Hereinafter, embodiments of the present disclosure will be described with reference to the accompanying drawings.

First Embodiment

FIG. 1 is a diagram illustrating an example of a schematic configuration of a mobile object communication system 100 according to the present disclosure. As illustrated in FIG. 1, the mobile object communication system 100 includes a roadside device 1, a center 2, and a vehicle side device 3 used in a vehicle V.

In FIG. 1, only one roadside device 1 is shown for convenience, but multiple roadside devices 1 may be provided as the entire mobile object communication system 100. In addition, multiple vehicle side devices 2 may be provided as the entire mobile object communication system 100.

Next, a schematic configuration of the mobile object communication system 100 will be described. The roadside device 1 and the center 2 are facilities that are managed by a service provider which is an existence (for example, a company, a shop, a public institution, etc.) that provides a predetermined service through the roadside device 1 or the center 2 to a user using the vehicle side device 3.

The roadside device 1 and the vehicle side device 3 are configured to perform a wireless communication directly with each other according to the standard of WAVE (wireless access in vehicular environment). For the sake of convenience, in the following description, the wireless communication conforming to the WAVE standard is referred to as WAVE communication. The WAVE communication corresponds to a short range wireless communication.

More specifically, in the WAVE, one control channel and multiple (for example, six) service channels are allocated as communication channels. The control channel and the multiple service channels are realized by respective different frequencies. The control channel and the multiple service channels may be realized with the use of frequencies belonging to a 5.8 GHz band, a 5.9 GHz band, and a 2.4 GHz band. It is needless to say that the control channel and the multiple service channels may be realized with the use of frequencies belonging to other frequency bands.

The service channels are directed to communication channels used for the vehicle side device 3 and the roadside device 1 to transmit and receive service provision information which is information for providing and using the service. A unique number (hereinafter referred to as a channel number) is assigned to each of the multiple service channels, and each service channel may be distinguished by a channel number set for that service channel.

In addition, the control channel is a communication channel used for the roadside device 1 for distribution of a WSA (wave service advertisement), which is a message for the roadside device 1 and the vehicle side device 3 to start a communication with each other using a predetermined service channel. The WSA corresponds to service start information. As will be described later, the WSA includes service type information indicating the type of service provided by the roadside device 1, channel information for designating a service channel used for providing a service among the multiple service channels, and so on.

The WSA also includes information for designating a communication mode when the roadside device 1 and the vehicle side device 3 perform the communication with each other using the service channel for providing and using the service. The roadside device 1 designates a desired communication mode in the WSA, thereby being capable of performing a communication with the vehicle side device 3 in the designated communication mode using the service channel.

The vehicle side device 3 receives the WSA delivered from the roadside device 1, thereby being capable of grasping the type of service provided by the roadside device 1, the service channel to be connected for using the service, and so on. The communication using the roadside device 1 and the service channel is performed, to thereby use the service provided by the roadside device 1. In other words, the control channel used for transmission and reception of the WSA functions as a communication channel used for connection control of the communication using the service channel between the roadside device 1 and the vehicle side device 3.

The roadside device 1 and the vehicle side device 3 each switch the communication channels (hereinafter referred to as transmission and reception channels) to be transmitted and received, to thereby perform the communication by the control channel and the communication by the service channels with each other.

In addition, the center 2 and the vehicle side device 3 are configured to communicate with each other through a wide area communication network 4 such as a cellular phone network or an Internet network. The center 2 provides services of the same contents as those of the services provided by the roadside device 1 by a communication (hereinafter referred to as wide area communication) through the vehicle side device 3 and the wide area communication network 4.

A base station 41 illustrated in FIG. 1 is a radio base station for realizing a wide area communication between the center 2 and the vehicle side device 3. The base station 41 receives the wide area communication signal transmitted from the vehicle side device 3 and provides the received signal to the center 2 through the wide area communication network 4. In addition, the base station 41 transmits the signal input from the center 2 to the vehicle side device 3 through the wide area communication network 4.

A unique identification code (hereinafter, device ID) is set for each of the roadside device 1 and the vehicle side device 3. In addition, the data transmitted by each device includes the device ID of the transmission source, and the device that has received the data can identify the transmission source of the data according to the device ID included in the data.

Next, a mode of the communication in the WAVE will be described. More specifically, a communication mode when the roadside device 1 and the vehicle side device 3 perform the communication using the service channels will be described. In the WAVE, a standard method, an immediate start method, and an extension method are defined as the communication modes when the roadside device 1 and the vehicle side device 3 perform the communication using the service channels. The service provider can employ any communication mode from those multiple communication modes. The standard method, the immediate start method, and the extension method correspond to methods called a normal method, an immediately method, and an extended method, respectively.

Figure 2:
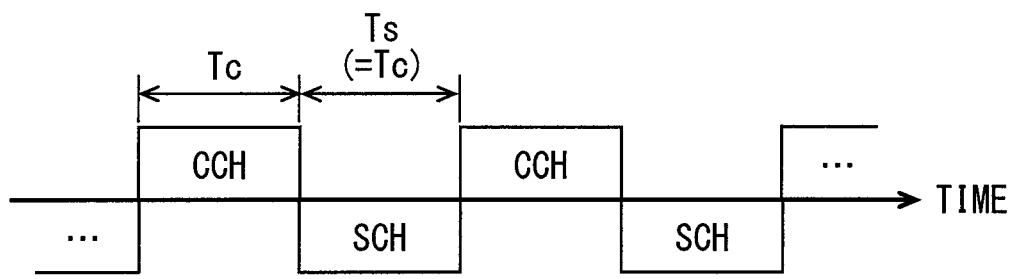
FIG. 2 is a conceptual diagram illustrating a flow of a communication in a WAVE standard.

Basically, in the WAVE, a CCH time period, which is a time period in which the communication using the control channel is to be performed, and a SCH time period, which is a time period in which the communication using the service channels is to be performed, are alternately switched at predetermined time intervals (for example, 50 milliseconds) as illustrated in FIG. 2. The CCH is an abbreviation for the control channel (control channel), and the SCH is an abbreviation for each service channel (service channel). A duration Tc of the CCH time period and a duration Ts of the SCH time period may be appropriately designed. One round of the CCH time period and the SCH time period is referred to as one cycle.

In the standard method, each of the roadside device 1 and the vehicle side device 3 switches between the communication using the control channel and the communication using the service channel according to a change between the CCH time period and the SCH time period. In other words, each device sets the control channel as the transmission and reception channel in the CCH time period and sets the service channel corresponding to the service to be provided or used in the SCH time period as the transmission and reception channel.

When the vehicle side device 3 has received the WSA corresponding to the service to be used by the vehicle side device 3 in a state where the control channel is set as the transmission and reception channel, the vehicle side device 3 starts a communication using the service channel indicated by the WSA with the roadside device 1 at a timing when a SCH time period starts. In addition, if communication processing for providing and using the service has not been completed in one SCH time period, the communication is once switched back to the communication using the control channel, and the communication using the service channel is resumed in the next and subsequent SCH time periods.

Hereinafter, that the vehicle side device 3 starts the communication using the predetermined service channel with the roadside device 1 is also expressed as opening the service channel. When there is no service to be used, the vehicle side device 3 may maintain the transmission and reception channel as the control channel even in the SCH time period.

In the immediate start method, as soon as the vehicle side device 3 receives a WSA, the vehicle side device 3 starts the communication using the service channel indicated in the WSA. Upon receiving the WSA by which the immediate start method is designated, the vehicle side device 3 terminates the communication using the control channel without waiting for the expiration of the CCH time period, and starts the communication using the service channel indicated by the received WSA.

When transmitting the WSA designating the immediate start method, the roadside device 1 promptly switches the transmission and reception channel to the service channel designated by the WSA from the control channel.

The extension method is a method in which the vehicle side device 3 and the roadside device 1 continuously perform the communication using the service channel for a time longer than the time Ts defined in advance.

However, the timing itself of starting the communication using the service channel is a timing at which the CCH time period expires and the SCH time period starts.

The communication mode exemplified in this example is an example of a communication mode between the roadside device 1 and the vehicle side device 3. In other words, the communication mode between the roadside device 1 and the vehicle side device 3 is not limited to the example described above, and the communication may be performed in a mode other than the example described above.

Next, the configuration and operation of the roadside device 1 will be described. The roadside device 1 performs the wireless communication with the vehicle side device 3 existing in the wireless communication area provided by the roadside device 1, transmits various information to the vehicle side device 3, and receives various information from the vehicle side device 3, thus providing a predetermined service. The roadside device 1 corresponds to a service provision device.

The service provided by the roadside device 1 is, for example, an automatic toll collection service when traveling on a toll road, an automatic parking fee collection service at a time of parking, a traffic information distribution service, a position information notification service, an advertisement distribution service, and the like.

The roadside device 1 may be fixed to a roadside or may be portable. Further, the roadside device 1 may be mounted on the mobile object such as a vehicle. The roadside device 1 may be present at a position suitable for the content of the service provided by the roadside device 1.

For example, when the roadside device 1 provides a service (that is, a traffic information distribution service) for distributing real time traffic information, the roadside device 1 may be installed at an intersection, in the middle of a road, or the like. In addition, when the roadside device 1 provides a drive-through type service, the roadside device 1 may be installed so as to provide a desired wireless communication area in the vicinity of an entrance of a facility. The drive-through type service is a service of providing a predetermined service, delivery of goods, and settlement of the service or the goods, without allowing user to get off the vehicle V.

In addition, the roadside device 1 may be provided at a position corresponding to the type of service to be provided, such as a parking lot or an entrance to a toll road. The wireless communication area of the roadside device 1 determined according to the output of the radio wave transmitted by the roadside device 1 can be set according to the service provided by the roadside device 1. When the set wireless communication area is wide, the set wireless communication area may overlap with the wireless communication area of another roadside device 1.

Figure 3:
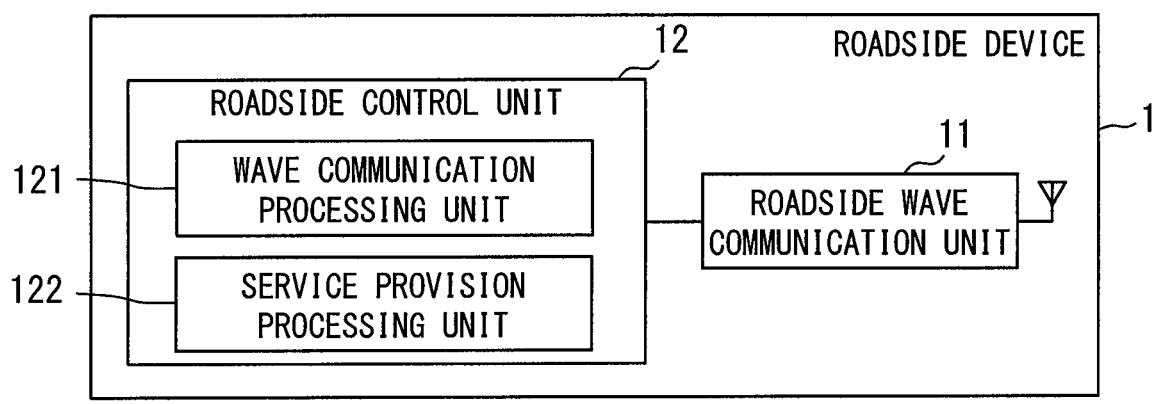
FIG. 3 is a block diagram illustrating an example of a schematic configuration of a roadside device.

As illustrated in FIG. 3, the roadside device 1 includes a roadside WAVE communication unit 11 and a roadside control unit 12. The roadside WAVE communication unit 11 and the roadside control unit 12 are connected to each other so as to be mutually communicable.

The roadside WAVE communication unit 11 performs the WAVE communication with the vehicle side device 3 existing in the wireless communication area provided by the roadside device 1. The roadside WAVE communication unit 11 includes an antenna for performing the WAVE communication, and demodulates a signal received by the antenna and outputs the demodulated signal to the roadside control unit 12, modulates data input from the roadside control unit 12, and further converts the modulated data into a radio wave, and transmits the radio wave.

The roadside WAVE communication unit 11 is configured so as to switch a communication channel as a transmission and reception channel among the control channel and the multiple service channels. Both of the communication using the control channel and the communication using the service channel with the vehicle side device 3 are performed through the roadside WAVE communication unit 11. Among the control channel and the multiple service channels, the communication channel set to the transmission and reception channel is switched based on an instruction from the roadside control unit 12.

The roadside control unit 12 is configured as a computer, and includes a CPU not shown, a memory, a storage, an I/O, and a bus line that connects those components to each other. The memory may be realized by a volatile memory such as a RAM, and functions as a calculation area for the CPU.

The storage is a nonvolatile storage medium, and is realized by, for example, a flash memory, a ROM, or the like. The storage stores a program (hereinafter referred to as a roadside device program) for causing a normal computer to function as the roadside control unit 12 in the present embodiment, the device ID allocated to the roadside device 1, and so on. Information for generating the WSA is also stored in the storage.

The roadside control unit 12 includes a WAVE communication processing unit 121 and a service provision processing unit 122 as functional blocks realized by executing the roadside device program described above. Part or all of the functions to be executed by the roadside control unit 12 may be realized as hardware with the use of one or more ICs or the like.

The WAVE communication processing unit 121 controls the operation of the roadside WAVE communication unit 11.

Figure 4:
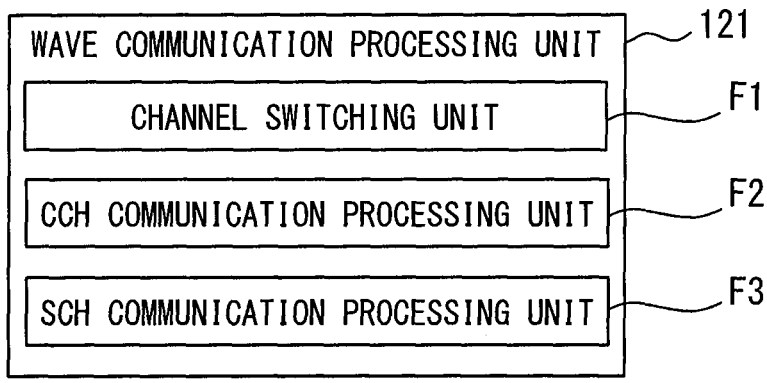
FIG. 4 is a block diagram illustrating an example of a schematic configuration of a WAVE communication processing unit.

As illustrated in FIG. 4, the WAVE communication processing unit 121 includes a channel switching unit F1, a CCH communication processing unit F2, and an SCH communication processing unit F3 as finer functional blocks.

The channel switching unit F1 switches a communication channel that is a transmission and reception channel of the roadside WAVE communication unit 11 to another, to switch between the communication using the control channel and the communication using the service channel.

When the channel switching unit F1 causes the roadside WAVE communication unit 11 to perform the communication using the service channel, the communication channel set as the transmission and reception channel by the channel switching unit F1 is a service channel corresponding to the service to be provided among the multiple service channels. Among the multiple service channels, the service channels used for providing the service are uniquely determined according to the type of service to be provided or the like.

The CCH communication processing unit F2 performs the communication using the control channel in cooperation with the roadside WAVE communication unit 11. The CCH communication processing unit F2 generates the WSA and causes the roadside WAVE communication unit 11 to transmit the generated WSA by a broadcast method. In addition, when the roadside WAVE communication unit 11 receives data transmitted from the vehicle side device 3 with the use of the control channel, the CCH communication processing unit F2 acquires the received data and provides the acquired data to the service provision processing unit 122. The CCH communication processing unit F2 may operate when the transmission and reception channel of the roadside WAVE communication unit 11 is set as the control channel by the channel switching unit F1.

Figure 5:
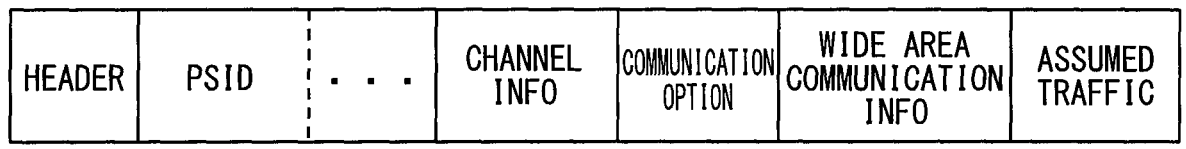
FIG. 5 is a conceptual diagram illustrating information provided by a WSA.

Now, the WSA will be described with reference to FIG. 5. The WSA transmitted by the CCH communication processing unit F2 in cooperation with the roadside WAVE communication unit 11 includes a header, service type information, channel information, communication options, and wide area communication information, as illustrated in FIG. 5. Further, in the present embodiment, the WSA includes an assumed value (hereinafter referred to as an assumed traffic) of the data traffic that occurs when the vehicle side device 3 performs the communication using the service channel for using the service corresponding to the WSA. In other words, the assumed traffic corresponds to the total size of data transmitted to and received from the roadside device 1 for the vehicle side device 3 to use the service.

The header is information for recognizing that the reception data is WSA in the vehicle side device 3 which is a reception side device. For example, the header includes information indicating the version of the WAVE standard, information for distinguishing the WSA from other information such as service provision information, and the like.

The service type information is information indicating the type of service provided by the roadside device 1. The service type information indicates the type of service by an identification code (PSID: provider service identification) set for each service type. Upon receiving the WSA, the vehicle side device 3 refers to the service type information included in the WSA, and can specify the type of service corresponding to the WSA, in other words, the type of service provided by the roadside device 1 that is a source of the WSA.

The channel information is information indicating the channel number of the service channel used for the roadside device 1 to provide the service among the multiple service channels. It should be noted that the service channel used for providing the service may be appropriately determined according to the service to be provided. Multiple services may be associated with the same service channel. Referring to the channel information, the vehicle side device 3 can specify the service channel used for provision of the service by the roadside device 1.

The communication option is information indicating a communication mode at the time of executing the communication with the use of the service channel such as a standard method, an immediate start method, and an extension method. Referring to the communication options, the vehicle side device 3 can recognize the communication mode at the time of executing the communication with the use of the service channel. When the communication mode is not designated in the received WSA, the vehicle side device 3 may employ the standard method.

The wide area communication information is information required when the vehicle side device 3 utilizes the same service as the service provided by the roadside device 1 by performing the wide area communication with the center 2. For example, the wide area communication information may include an address (for example, an IP address) on the communication network, a MAC address, and the like of the center 2 that provides the same service as the service provided by the roadside device 1.

Information for generating the WSA described above, in other words, information on the service to be provided, may be registered in a storage not shown. The information on the service to be provided includes, for example, a PSID, a channel number of the service channel used for providing the service, the type of the communication mode, the wide area communication information, an assumed traffic, and the like.

The SCH communication processing unit F3 performs the communication using the service channel in cooperation with the roadside WAVE communication unit 11. The SCH communication processing unit F3 outputs the service provision information provided from the service provision processing unit 122 to the roadside WAVE communication unit 11 and transmits the information. The transmission method may be one of broadcast, unicast, and multicast, and the transmission method to be used depends on the type of service. In addition, the SCH communication processing unit F3 acquires the data received by the roadside WAVE communication unit 11 through the communication using the service channel, and provides the data to the service provision processing unit 122. The SCH communication processing unit F3 may operate when the transmission and reception channel of the roadside WAVE communication unit 11 is set as the service channel by the channel switching unit F1.

The service provision processing unit 122 performs processing for providing a predetermined service to the vehicle side device 3 present in the wireless communication area. Specifically, the service provision processing unit 122 generates the service provision information according to the service to be provided and provides the generated service provision information to the WAVE communication processing unit 121. In addition, the service provision processing unit 122 performs processing corresponding to the data input from the WAVE communication processing unit 121.

For example, when the service provided by the roadside device 1 is an automatic toll collection service at the time of using a toll road, the service provision processing unit 122 generates data requesting a return of information necessary for settlement of the utilization fee of the toll road (hereinafter referred to as accounting information) as the service provision information, and provides the generated data to the WAVE communication processing unit 121 for transmission. The accounting information is information for specifying a user as a billing destination such as an identification number of a vehicle, for example. In addition, the service provision processing unit 122 records an entered entrance, an entrance time, a left exit, an exit time and the like in association with the accounting information. The user of the vehicle side device 3 is charged with a fee corresponding to a section using the toll road or a use time period.

Next, the center 2 will be described. As described above, the center 2 is connected to the wide area communication network 4 and configured so as to communicate with the vehicle side device 3 through the wide area communication network 4. The center 2 may be realized by using one server device or may be realized by using multiple server devices. In the present embodiment, the center 2 is connected to the wide area communication network 4 by a wired communication, but the center 2 may access the wide area communication network 4 wirelessly.

Figure 6:
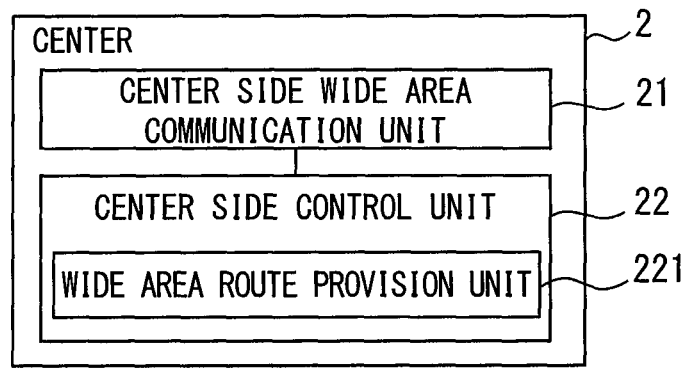
FIG. 6 is a block diagram illustrating an example of a schematic configuration of a center.

As illustrated in FIG. 6, the center 2 includes a center side wide area communication unit 21 and a center side control unit 22. The center side wide area communication unit 21 and the center side control unit 22 are connected to each other so as to be mutually communicable.

The center side wide area communication unit 21 performs a wide area communication with the vehicle side device 3. In other words, the center side wide area communication unit 21 acquires the data transmitted from the vehicle side device 3 and provides the acquired data to the center side control unit 22. In addition, the center 2 converts the data input from the center side control unit 22 into a predetermined communication format and transmits the converted communication format to the vehicle side device 3.

The center side control unit 22 includes a CPU not shown, a memory, a storage, an I/O, and a bus line that connects those components to each other, and is configured as a computer that performs various arithmetic processing. The center side control unit 22 controls the operation of the center side wide area communication unit 21 and transmits and receives data to and from the center side wide area communication unit 21.

Further, the center side control unit 22 performs processing for providing the same service as the service provided by the roadside device 1 to the vehicle side device 3 based on a request from the vehicle side device 3. For the sake of convenience, among the functions of the center side control unit 22, functions that are in charge of processing for providing the same service as the service provided by the roadside device 1 to the vehicle side device 3 are referred to as a wide area route provision unit 221. The wide area route provision unit 221 may be realized by the CPU executing a predetermined program, or may be realized by hardware with the use of one or multiple ICs.

When the center 2 is connected to the roadside device 1 so as to communicate with each other through a LAN (local area network) not shown, the center side control unit 22 may be provided with a function of controlling the operation of the roadside device 1. When the center 2 and the roadside device 1 are connected so as to communicate with each other, the center side control unit 22 may be provided with a function corresponding to the service provision processing unit 122, and the center side control unit 22 may provide a predetermined service to the vehicle side device 3 through the roadside device 1. In that case, the roadside device 1 functions as a communication interface between the center 2 and the vehicle side device 3.

Next, the configuration and operation of the vehicle side device 3 will be described. Various vehicles traveling on the road, such as a passenger car, a bus, and a truck correspond to the vehicle V in which the vehicle side device 3 is used. Also, in FIG. 1, a four-wheeled vehicle is illustrated as the vehicle V, but the vehicle V may be a two-wheeled vehicle or a three-wheeled vehicle. The two-wheeled vehicle includes a bicycle.

In the present embodiment, the vehicle side device 3 is mounted on the vehicle V, but in another embodiment, the vehicle side device 3 may be brought into the vehicle V by the user. The mode mounted on the vehicle V includes not only a mode in which the vehicle side device 3 is incorporated in the vehicle V but also a mode in which the vehicle side device 3 is detachably attached to a holder or the like provided in the vehicle V. Hereinafter, the vehicle V on which the vehicle side device 3 is mounted is also referred to as a host vehicle. The vehicle side device 3 corresponds to a mobile object side device.

Figure 7:
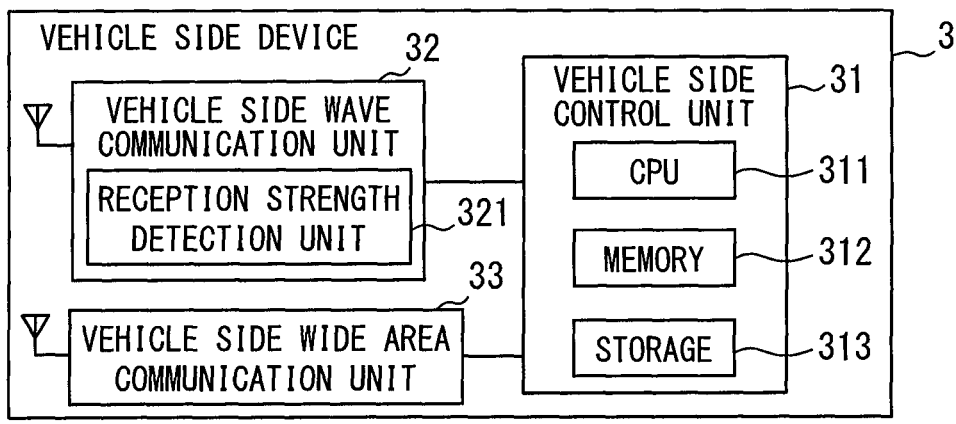
FIG. 7 is a block diagram illustrating an example of a schematic configuration of a vehicle side device.

As illustrated in FIG. 7, the vehicle side device 3 includes a vehicle side control unit 31, a vehicle side WAVE communication unit 32, and a vehicle side wide area communication unit 33. The vehicle side control unit 31 is connected to each of the vehicle side WAVE communication unit 32 and the vehicle side wide area communication unit 33 so as to communicate with each other, and controls the operation of the entire vehicle side device 3. Details of the vehicle side control unit 31 will be described later.

The vehicle side WAVE communication unit 32 includes an antenna for performing the WAVE communication, and demodulates a signal received by the antenna to output the demodulated signal to the vehicle side control unit 31, modulates the data input from the vehicle side control unit 31, further converts the modulated data into a radio wave, and transmits the radio wave. The vehicle side WAVE communication unit 32 corresponds to a mobile object side short range communication unit.

The vehicle side WAVE communication unit 32 is configured so as to switch a communication channel as a transmission and reception channel among the control channel and the multiple service channels. Both of the communication using the control channel and the communication using the service channel with the roadside device 1 are performed through the vehicle side WAVE communication unit 32. Among the control channel and the multiple service channels, the communication channel serving as the transmission and reception channel is switched based on an instruction from the vehicle side control unit 31.

Further, the vehicle side WAVE communication unit 32 includes a reception strength detection unit 321 that detects a strength (hereinafter referred to as reception strength) of a received signal. A value indicating the reception strength corresponds to an RSSI (received signal strength indication). The reception strength detection unit 321 may be realized by using a well-known reception strength detection circuit. The reception strength detection unit 321 corresponds to a reception strength acquisition unit.

The reception strength detected by the reception strength detection unit 321 is provided to the vehicle side control unit 31 in association with the reception data corresponding to the received signal. As a result, when the vehicle side WAVE communication unit 32 has received the WSA, the vehicle side control unit 31 can acquire the reception strength of the received WSA.

The vehicle side wide area communication unit 33 connects to the wide area communication network 4 through the base station 41, and performs the communication (that is, wide area communication) with the center 2. The vehicle side wide area communication unit 33 demodulates a signal transmitted from the center 2 to provide the demodulated signal to the vehicle side control unit 31, modulates a baseband signal input from the vehicle side control unit 31, and transmits the modulated baseband signal to the center 2. The signal transmitted from the center 2 is a signal corresponding to the service provision information. The vehicle side wide area communication unit 33 corresponds to a mobile object side wide area communication unit.

The vehicle side control unit 31 is configured as a computer, and includes a CPU 311, a memory 312, a storage 313, an I/O, and a bus line that connects those components to each other. The memory 312 may be realized by a volatile memory such as a RAM. The memory 312 functions as a calculation area for the CPU 311.

The storage 313 is a nonvolatile storage medium, and is realized by, for example, a flash memory, a ROM, or the like. The storage 313 stores a program (hereinafter referred to as a vehicle program) for causing a normal computer to function as the vehicle side control unit 31 in the present embodiment, the device ID allocated to the vehicle side device 3, and so on.

It should be noted that the vehicle program described above may be stored in a non-transitory tangible storage medium such as a ROM. The CPU 311 executing the appropriate program corresponds to execution of a method corresponding to the appropriate program. Also, the PSIDs of the services that are available for the vehicle side device 3 are registered in the storage 313.

Figures 8, 9:
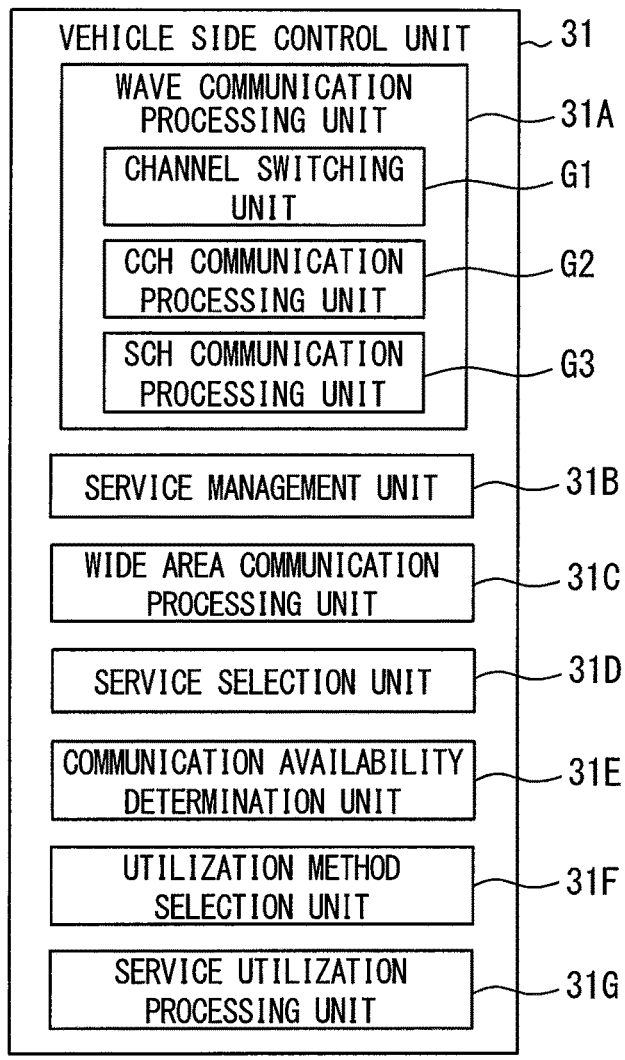
FIG. 8 is a block diagram illustrating an example of a schematic configuration of a vehicle side control unit.
FIG. 9 is a diagram illustrating a service list managed by a service management unit.

As illustrated in FIG. 8, the vehicle side control unit 31 includes a WAVE communication processing unit 31A, a service management unit 31B, a wide area communication processing unit 31C, a service selection unit 31D, a communication availability determination unit 31E, a utilization method selection unit 31F, and a service utilization processing unit 31G, as functional blocks realized by the execution of the vehicle program. Part or all of the functions to be executed by the vehicle side control unit 31 may be realized as hardware by one or more ICs or the like.

The WAVE communication processing unit 31A is a functional block corresponding to the WAVE communication processing unit 121 in the roadside device 1, and the WAVE communication processing unit 31A controls the operation of the vehicle side WAVE communication unit 32. In addition, the WAVE communication processing unit 31A includes a channel switching unit G1, a CCH communication processing unit G2, and an SCH communication processing unit G3 as finer functional blocks.

The channel switching unit G1 switches a communication channel that is a transmission and reception channel of the vehicle side WAVE communication unit 32 to another, to switch between the communication using the control channel and the communication using the service channel. Among the multiple service channels, the service channel set by the channel switching unit G1 for the transmission and reception channel is a service channel corresponding to the service to be used. The service channel corresponding to the service to be used is a service channel designated in the WSA that has notified the service to be used.

The CCH communication processing unit G2 performs the communication using the control channel in cooperation with the vehicle side WAVE communication unit 32. In other words, the CCH communication processing unit G2 sequentially acquires the WSA received by the vehicle side WAVE communication unit 32 through the communication using the control channel. The CCH communication processing unit G2 provides the acquired WSA to the service management unit 31B.

The SCH communication processing unit G3 performs the communication using a predetermined service channel in cooperation with the vehicle side WAVE communication unit 32. The service channel used in this example is a service channel corresponding to the service to be used. The SCH communication processing unit G3 acquires the service provision information transmitted from the roadside device 1, and provides the acquired service provision information to the service utilization processing unit 31G.

The service management unit 31B acquires information on the services provided by the roadside device 1 existing in the vicinity of the host vehicle V based on the WSA provided from the WAVE communication processing unit 31A, and manages (for example, holds, updates, deletes, and so on) the acquired information on the services. The information on the services provided by the roadside device 1 existing in the vicinity of the host vehicle V may be managed by a service list in which information (hereinafter referred to as service information) for each service is expressed in a list form as shown in FIG. 9.

The service information includes, for example, a PSID, channel information, a reception time of the WSA that has notified the service, a reception strength of the WSA, the wide area communication information, the assumed traffic, and the like. The service information may also include information on a service provider that provides the services.

The service management unit 31B updates the service list each time the WSA is provided from the WAVE communication processing unit 31A, that is, every time the vehicle side WAVE communication unit 32 receives the WSA. Specifically, when the WSA corresponding to a service not yet registered in the service list is provided, the service management unit 31B registers service information on the service in the service list.

Also, when receiving the WSA for the service already registered in the service list, the service management unit 31B updates a column of the reception strength and the reception time based on the newly received WSA.

Incidentally, when the host vehicle V leaves the wireless communication area of one roadside device 1, since the WSA from the roadside device 1 cannot be received, the reception time, the reception strength, and so on of the service provided by the roadside device 1 are no longer updated. In other words, in the case of a service whose reception time is past a certain time or more from the present time, there is a high possibility that the host vehicle V leaves the wireless communication area of the roadside device 1 that provides the service.

Therefore, in the case of a service whose reception time is past a predetermined scheduled update time or more from the present, the service management unit 31B rewrites a value in the column of the reception strength to a value (for example, −99 dBm) making the WAVE communication difficult (including impossibility). As another mode, instead of rewriting the value in the column of the reception strength, the service management unit 31B may add information indicating that the WAVE communication with the roadside device 1 that provides the service is difficult to the service information.

The scheduled update time used in this case is a maximum value of a time assumed as a time required from a previous reception until a next reception of the WSA notifying the same service. The scheduled update time may be determined according to the time for one cycle, for example, may be twice the time for one cycle. It should be noted that, in cases where the communication is performed by the immediate start method or the extension method, processing may be exceptionally performed.

Furthermore, the service management unit 31B deletes, from the service list, the service for which processing for using the service has been completed, or registers that the service has been processed with the use of a flag or the like. In other words, the service list functions as a list of services that have not yet been used (in other words, unprocessed services) out of the services once made available by the WAVE communication. The service management unit 31B corresponds to an unprocessed service management unit.

The service list described above may be stored in the memory 312. If the service corresponding to the received WSA is not a service that the host vehicle V should use, the service management unit 31B does not register the information on the service corresponding to the received WSA in the service list.

The wide area communication processing unit 31C controls the operation of the vehicle side wide area communication unit 33 and acquires the data received by the vehicle side wide area communication unit 33. In addition, the wide area communication processing unit 31C generates data to be transmitted to the center 2, and outputs the generated data to the vehicle side wide area communication unit 33 for transmission.

The service selection unit 31D selects the next service to be used from the unprocessed services registered in the service list. The communication availability determination unit 31E executes a communication availability determination process (details will be described later) for determining whether the WAVE communication can be performed with the roadside device 1 that provides the service selected by the service selection unit 31D, or not.

The utilization method selection unit 31F selects a method for using the service to be used. As the utilization methods of the service, there are use by the WAVE communication and use by the wide area communication. The service utilization processing unit 31G performs processing (hereinafter referred to as service utilization processing) for utilizing the service selected by the service selection unit 31D with the use of the wide area communication or the WAVE communication. Details of the service selection unit 31D, the communication availability determination unit 31E, the utilization method selection unit 31F, and the service utilization processing unit 31G will be described separately later.

Next, a series of processing (hereinafter referred to as service utilization related processing) performed by the vehicle side control unit 31 to start using the service provided by the roadside device 1 will be described with reference to a flowchart shown in FIG. 10. For example, the service utilization related process may be sequentially executed while an ignition power supply of the host vehicle V is turned on and a power is supplied to the vehicle side device 3.

First, in Step S1, the WAVE communication processing unit 31A determines whether the WSA has been received, or not. When the WSA has received, an affirmative determination is made in Step S1 and the process goes to Step S2. On the other hand, if the WSA has not been received, a negative determination is made in Step S1 and the process proceeds to Step S5. It is to be noted that if the communication using the service channel is being executed at the time of executing Step S1, it is only necessary to make a negative determination in Step S1.

In Step S2, the WAVE communication processing unit 31A determines whether the received WSA is a WSA designating the immediate start method, or not. If the received WSA is the WSA designating the immediate start method, an affirmative determination is made in Step S2, the process proceeds to Step S3, the service channel indicated in the WSA is opened, and the present flow is completed. When the present flow is completed, the service utilization related process may be promptly restarted.

In the case where the received WSA is not the WSA designating the immediate start method, a negative determination is made in Step S2 and the flow proceeds to Step S4. In Step S4, the service management unit 31B updates the service list based on the received WSA, and completes the present flow.

In Step S5, the WAVE communication processing unit 31A determines whether the CCH time period has expired, or not. If the CCH time period has not expired, a negative determination is made in Step S5 and the present flow is completed. On the other hand, if the CCH time period has expired, an affirmative determination is made in Step S5 and the process proceeds to Step S6.

In Step S6, the WAVE communication processing unit 31A determines whether the service channel to be connected in the SCH time period starting from now has been determined, or not. If the service channel to be connected is determined, an affirmative determination is made in Step S6 and the process proceeds to Step S3 to open the service channel. On the other hand, if the service channel to be connected is not determined, a negative determination is made in Step S6 and the process proceeds to Step S7.

In Step S7, it is determined whether an unprocessed service is present, or not, referring to the service list. If the unprocessed service is present, an affirmative determination is made in Step S7 and the process proceeds to Step S8. On the other hand, if there is no unprocessed service, a negative determination is made in Step S7 and the present flow is completed.

In Step S8, the service selection unit 31D executes the service selection process and proceeds to Step S9. In this service selection process, the service selection unit 31D selects the service to be subjected to the service utilization processing, in other words, the service to be used from now on is selected, among the unprocessed services registered in the service list. In the present embodiment, as an example, it is assumed to select a service with the largest assumed traffic among the services registered in the service list.

In Step S9, a communication availability determination process is executed. The communication availability determination process will be described with reference to FIG. 11. A flowchart shown in FIG. 11 may be started when shifting to Step S9 in FIG. 10.

First, in Step S91, the communication availability determination unit 31E determines whether the WAVE communication can be performed with the roadside device 1 that provides the service selected by the service selection unit 31D, or not, based on the registered reception strength as service information.

Specifically, when the reception strength of the WSA associated with the service selected by the service selection unit 31D is lower than a predetermined threshold (hereinafter referred to as a strength threshold), the communication availability determination unit 31E determines that the WAVE communication cannot be performed with the roadside device 1. When the reception strength of the WSA associated with the service selected by the service selection unit 31D is equal to or higher than the strength threshold, the communication availability determination unit 31E determines that the WAVE communication can be performed with the roadside device 1.

In this example, the strength threshold may be set as a lower limit value of the reception strength at which a predetermined communication quality (for example, bit error rate, etc.) of the WAVE communication can be expected to fall within a predetermined allowable range. For example, the strength threshold may be a lower limit value (hereinafter referred to as a decoding limit value) of the reception strength with which the vehicle side WAVE communication unit 32 can decode the received signal, and in this example, the strength threshold is set to −90 dBm.

If the communication availability determination unit 31E determines that the WAVE communication can be performed with the roadside device 1 that provides the service selected by the service selection unit 31D, an affirmative determination is made in Step S91, and the process proceeds to Step S92. On the other hand, if it is determined that the WAVE communication cannot be performed with the roadside device 1 that provides the service selected by the service selection unit 31D, a negative determination is made in Step S91 and the process proceeds to Step S93.

In Step S92, the utilization method selection unit employs the WAVE communication as a method of using the service to be used, and completes the communication availability determination process. In Step S93, the utilization method selection unit employs the wide area communication as a method of using the service to be used, and completes the communication availability determination process. When the communication availability determination process is completed, the process proceeds to Step S10 of the service utilization related process that is a caller of the process.

Again, returning to FIG. 10, the description of the service utilization related process will be continued. In Step S10, the service utilization processing unit 31G executes a process (that is, a service utilization process) for using the service selected by the service selection unit 31D, with the use of the utilization method selected by the utilization method selection unit 31F.

For example, when the utilization method selection unit 31F employs the WAVE communication, the utilization method selection unit 31F instructs the WAVE communication processing unit 31A to set the transmission and reception channel in the next SCH time period to a service channel corresponding to the service selected by the service selection unit 31D.

The service utilization processing unit 31G executes the processing corresponding to the data (that is, service provision information) received by the communication using the service channel. In this situation, when the service provision information transmitted from the roadside device 1 is information requesting the vehicle side device 3 to return the information required for provision of service, the service utilization processing unit 31G generates data indicating the required information, and returns the generated data through the vehicle side WAVE communication unit 32. The details of the specific processing may be appropriately designed according to the type of service.

When the utilization method selection unit 31F employs the wide area communication, the utilization method selection unit 31F cooperates with the wide area communication processing unit 31C to transmit a request signal requesting to provide the service selected by the service selection unit 31D toward the center 2. A destination of the request signal may be a destination indicated in the wide area communication information of the service selected by the service selection unit 31D. Upon receiving the request signal from the vehicle side device 3, the center 2 returns the service provision information to the vehicle side device 3 based on the request signal. The service utilization processing unit 31G performs processing according to the service provision information transmitted from the center 2.

Figure 12:
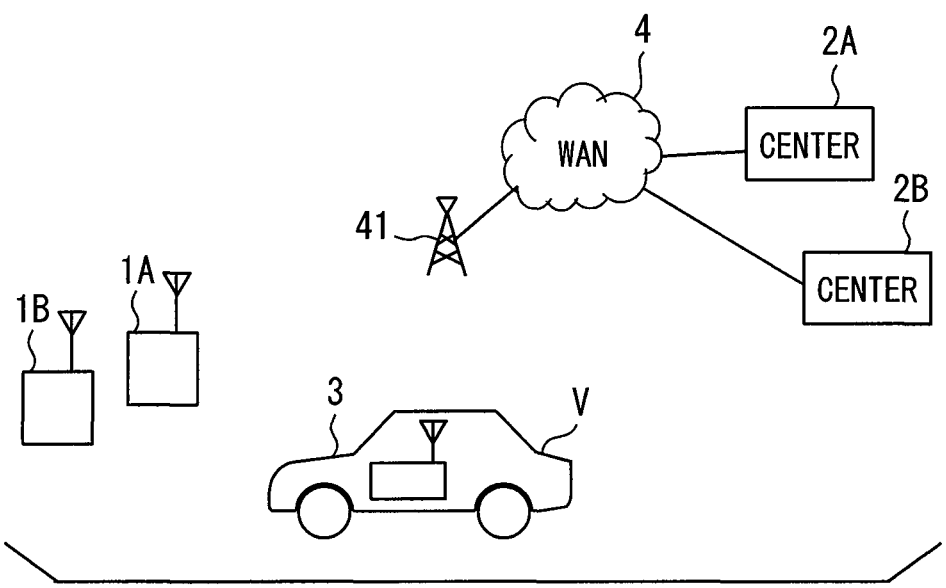
FIG. 12 is a diagram illustrating the operation and effects according to the first embodiment.

The operation of the mobile object communication system 100 described above will be described with reference to FIG. 12. FIG. 12 shows a situation where roadside devices 1A and 1B that provide different services are present around the vehicle (host vehicle) V on which the vehicle side device 3 is mounted. For convenience, the service provided by the roadside device 1A is referred to as a service A, and the service provided by the roadside device 1B is referred to as a service B.

The center 2A shown in FIG. 12 is the center 2 corresponding to the roadside device 1A, and provides a service A by a wide area communication. A center 2B shown in FIG. 12 is the center 2 corresponding to the roadside device 1B, and provides the service B by the wide area communication. Both of the service A and the service B are services registered as services to be used by the vehicle side device 3.

In such a situation, the vehicle side device 3 receives the WSA transmitted from each of the roadside devices 1A and 1B, and registers the service information corresponding to the services A and B in the service list. The service selection unit 31D selects one of the services A and B, which has a larger assumed traffic. In this case, as an example, it is assumed that the service A has more assumed traffic.

In such a case, the vehicle side device 3 uses the service A by performing the WAVE communication with the roadside device 1A, and thereafter attempts to use the service B by performing the WAVE communication with the roadside device 1B.

However, since the host vehicle V is a mobile object, while the service utilization process corresponding to the service A is being executed, the host vehicle V may leave the wireless communication area of the roadside device 1B. In the conventional configuration, when the host vehicle V leaves the wireless communication area of the roadside device 1B, the service B provided by the roadside device 1B cannot be used.

In response to such a problem, according to the configuration of the present embodiment, when the communication availability determination unit 31E cannot perform the WAVE communication with the roadside device 1B, the wide area communication is performed with the center 2B to use the service B. Therefore, according to the configuration of the present embodiment, a risk that the service provided by the roadside device 1 cannot be used with the movement of the host vehicle V can be reduced.

In the embodiment described above, the service selection unit 31D selects a service having a large assumed traffic with a higher priority when selecting the service to be used from the multiple services. According to the aspect described above, the risk of utilizing the service having a relatively large data traffic by the wide area communication can be reduced. Therefore, if the charge corresponding to the data traffic is generated for the wide area communication, the communication cost in the vehicle side device 3 can be reduced.

The embodiments of the present disclosure have been described above. However, the present disclosure is not limited to the above-described embodiments, and the following embodiments also fall within the technical scope of the present disclosure. Further, the present disclosure can be implemented with various changes without departing from the spirit of the present disclosure, aside from the following modifications.

Second Embodiment

Next, a second embodiment according to the present disclosure will be described with reference to the drawings. In the following description, the same reference numerals are given to members having the same function as those forming the first embodiment described above, and a description of such members will be omitted. When only a part of a configuration is described, the first embodiment described previously can be applied for the other parts of the configuration.

A main difference between the second embodiment and the first embodiment described above resides in a service utilization related process executed by the vehicle side control unit 31. More specifically, the operation when the WSA corresponding to the service to be processed is received in a state where there is no unprocessed service is different from the vehicle side control unit 31 in the first embodiment. Hereinafter, the service utilization related process performed by the vehicle side control unit 31 according to the second embodiment will be described.

Figure 13:
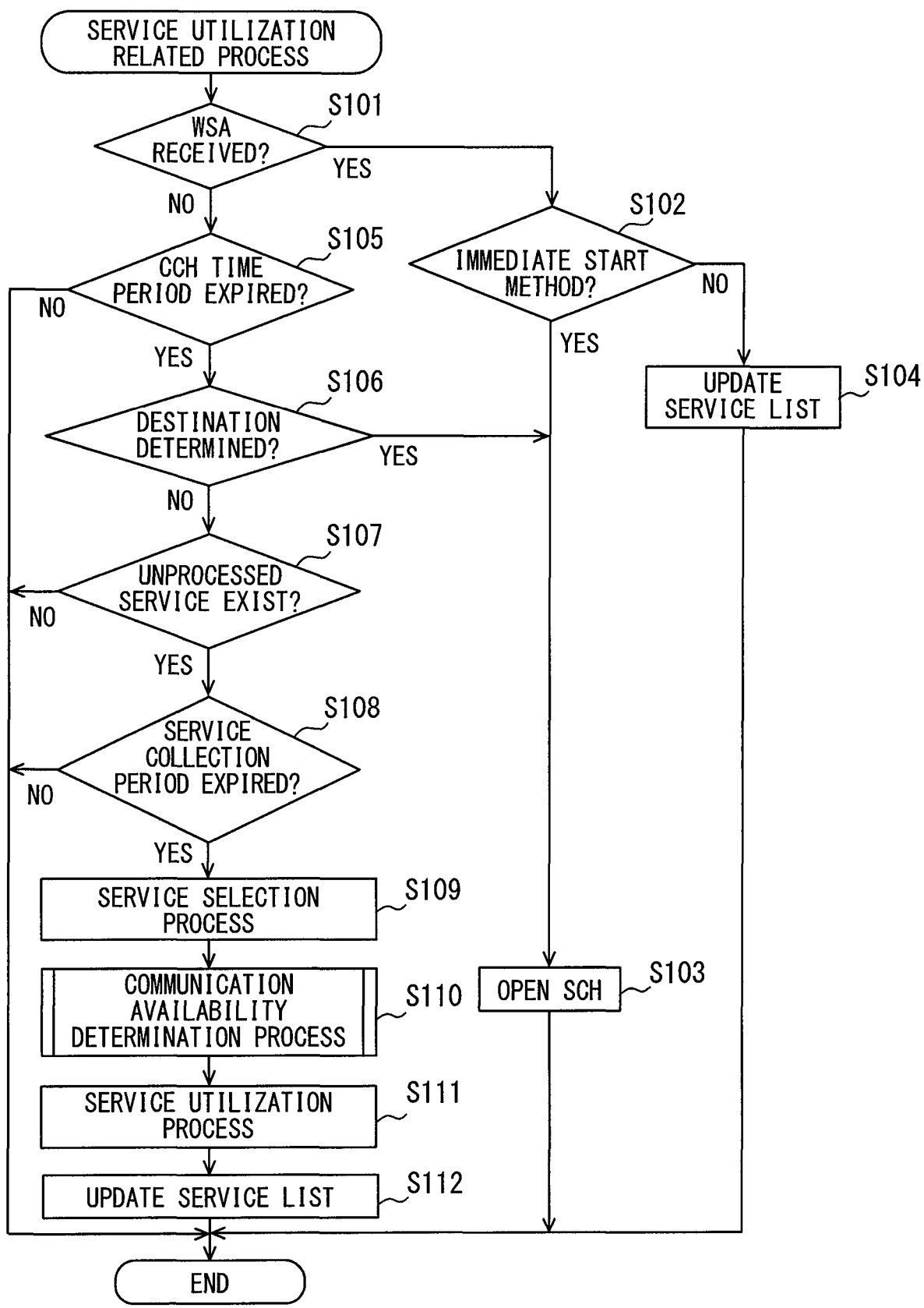
FIG. 13 is a flowchart of a service utilization related process according to a second embodiment of the present disclosure.

FIG. 13 is a flowchart illustrating the service utilization related process performed by the vehicle side control unit 31 according to the second embodiment. The processing in each step from Step S101 to Step S107 shown in FIG. 13 is the same as the processing in each step from Step S1 to Step S7 in FIG. 10.

However, in the present embodiment, when the WSA corresponding to a service to be newly processed is received in a state in which an unprocessed service does not exist in the service list, the WAVE communication processing unit 31A sets a service collection period to be described next. For the sake of convenience, in the subsequent description, the WSA that notifies the service to be newly processed, which is received in a state where there is no unprocessed service, will be referred to as a preceding WSA.

Figure 14:
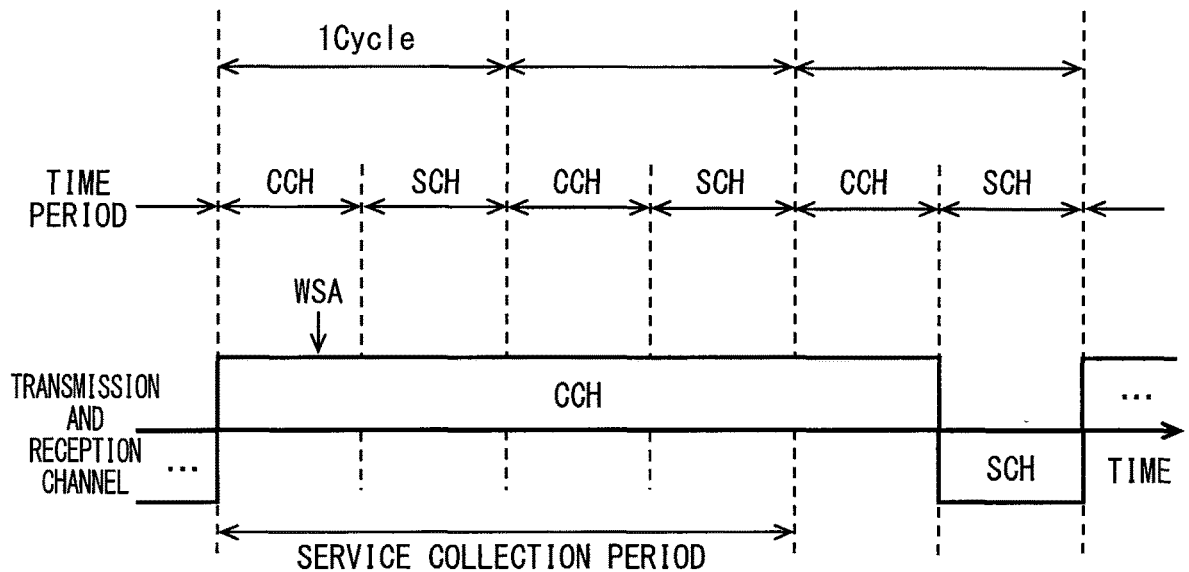
FIG. 14 is a diagram illustrating a service collection period.

The service collection period is a period during which the host vehicle V grasps all of the services available by the WAVE communication with the roadside device 1 at the current position. During the service collection period, the channel switching unit G1 of the WAVE communication processing unit 31A holds a state in which the transmission and reception channel is set as the control channel as shown in FIG. 14. In other words, during the service collection period, the service channel is not opened even in the SCH time period.

A length of the service collection period, a start time point, an end time point of the service collection period, and the like may be appropriately designed. In this case, as an example, the start time point of the CCH time period in which the preceding WSA is received is set as the start time point of the service collection period, and a period until the lapse of two cycles of time from the start time point of the service collection period is set as a service collection period. It is needless to say that, as another embodiment, the start time point of the service collection period may be set as a time point when the preceding WSA is received. It is preferable that the service collection period is set to include at least the SCH time period immediately after the CCH time period in which the preceding WSA is received. The duration from the reception of the preceding WSA to the end of the service collection period corresponds to a service collection duration.

When a WSA designating the immediate start method is received during the service collection period (YES in Step S102), it is assumed that, as shown in a flow of FIG. 13, the service collection period is terminated, and the service channel indicated in the received WSA is opened (Step S103).

The setting of the service collection period described above may be performed, for example, at the time of updating the service list in Step S104. This is because whether the WSA received in Step S101 corresponds to the preceding WSA, or not, can be identified by comparing the contents of the received WSA with the contents of the service list managed by the service management unit 31B.

In addition, in Step S108, it is determined whether the service collection period has expired, or not. If the service collection period has expired, an affirmative determination is made in Step S108 and the process proceeds to Step S109. On the other hand, if the service collection period has not expired, a negative determination is made in Step S108 and the present flow is completed.

Figure 10:
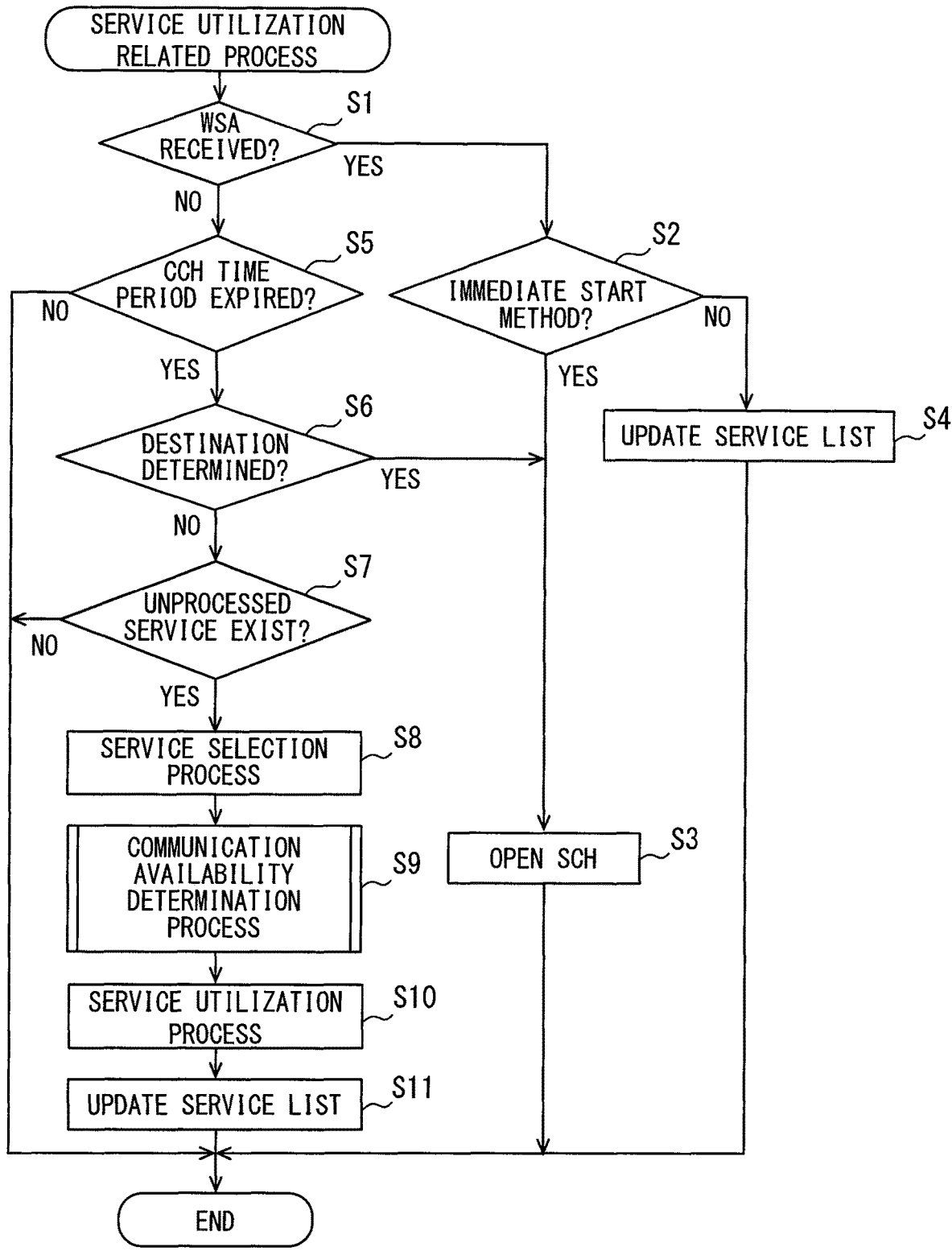
FIG. 10 is a flowchart of a service utilization related process according to the first embodiment.
Figure 11:
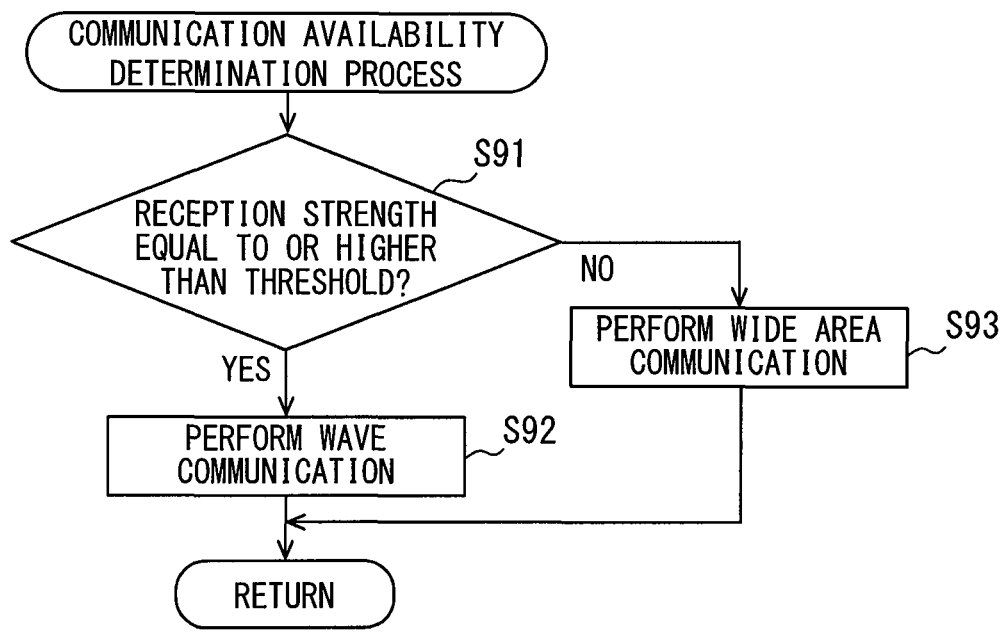
FIG. 11 is a flowchart of a communication availability determination process.

The processing in each step from Step S109 to Step S112 is the same as the processing in each step from Step S8 to Step S11 in FIG. 10.

Next, the operation and effects of the second embodiment will be described. According to the above configuration, when the WSA corresponding to the preceding WSA has been received, the communication using the control channel is continued for a predetermined service collection period, except when the WSA designating the immediate start method has been received, and the services available for the host vehicle V are collected.

Basically, it can be expected that the roadside device 1 is configured to transmit the WSA in the CCH time period. However, since it is not prohibited to transmit the WSA in the SCH time period, the roadside device 1 sometimes transmits the WSA in the SCH time period.

Therefore, if the service channel is opened in the SCH time period immediately after receiving the preceding WSA, there is concern that the reception of the WSA transmitted in the SCH time period fails.

In response to such concerns, according to the configuration of the second embodiment, in at least the SCH time period immediately after receiving the preceding WSA, the control channel remains set as the transmission and reception channel. For that reason, the WSA transmitted in the SCH time period can be prevented from failing to be received.

First Modification

The communication availability determination unit 31E employs different strength threshold depending on whether the reception strength of a signal (for example, WSA) transmitted from the roadside device 1 is increasing or decreasing, and whether the WAVE communication can be performed with the roadside device 1, or not, may be determined.

Specifically, when the reception strength is decreasing, the communication availability determination unit 31E may determine whether the WAVE communication can be performed with the roadside device 1 that provides the service selected by the service selection unit 31D with the use of a strength threshold larger than that when the reception strength is increasing (referred to as first modification). Whether the reception strength of the WSA transmitted from one roadside device 1 is increasing or decreasing may be determined by sorting the reception strengths of the received WSA in time series for each source, storing the received strengths in the memory 312, and comparing the latest reception strength for each roadside device 1 with the reception strength at the previous time.

According to the mode described above, the communication availability determination unit 31E can determine more properly whether the WAVE communication can be performed with the roadside device 1 that provides the service selected by the service selection unit 31D, or not. A specific configuration will be described below.

Figure 15:
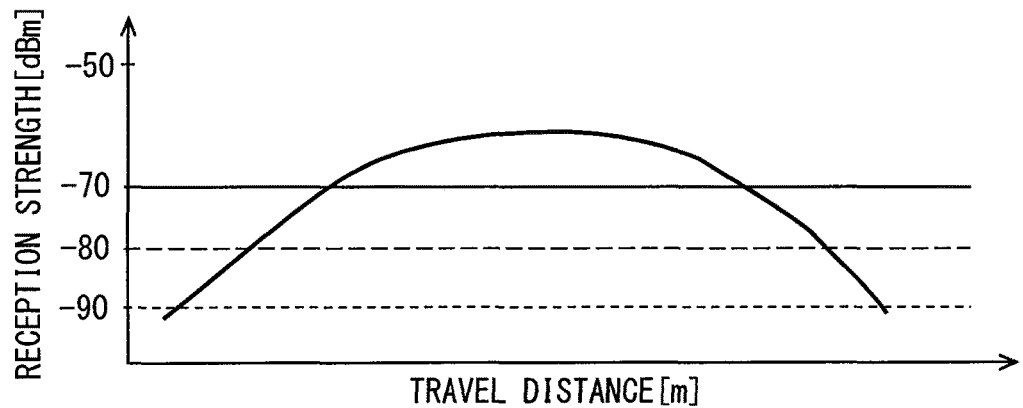
FIG. 15 is a diagram illustrating the operation of a utilization method selection unit in a first modification of the present disclosure.

In general, since the radio waves transmitted from the roadside device 1 are attenuated as the radio waves get away from the roadside device 1, the reception strength of the WSA from the roadside device 1 becomes smaller as a distance between the roadside device 1 and the host vehicle V is longer. Therefore, as shown in FIG. 15, the reception strength of the WSA in a process in which the host vehicle V enters and leaves the wireless communication area of the roadside device 1 transitions with a roughly upwardly convex. In other words, in the process where the host vehicle V comes closer to the roadside device 1, the reception strength of the WSA from the roadside device 1 tends to increase and in the process where the vehicle V leaves the roadside device 1, the reception strength of the WSA from the roadside device 1 tends to decrease.

Naturally, when the host vehicle V leaves the roadside device 1, the remaining time during which the host vehicle V is staying in the wireless communication area of the roadside device 1 is shorter than a time when the host vehicle V comes closer to the roadside device 1. In addition, the time required for the communication processing for using the service varies, and is not necessarily limited to a short time.

If the host vehicle V is away from the roadside device 1, even if the reception strength of the signal from the roadside device 1 at the time of starting the service use is equal to or higher than a decoding limit value, the host vehicle V may leave the wireless communication area of the roadside device 1 before the communication processing is completed. In that case, the communication processing with the roadside device 1 for using the service cannot be completed.

Therefore, the communication availability determination unit 31E does not determine whether the WAVE communication can be instantaneously performed, or not, but preferably determines whether the WAVE communication can be continuously performed for a sufficient time so that the communication processing for using the service can normally be completed, or not.

In response to such a problem, in the case where the reception strength is decreasing, the communication availability determination unit 31E according to the first modification uses a strength threshold value that is larger than that in the case where the reception strength is increasing. As a result, a risk that the host vehicle V leaves the wireless communication area of the roadside device 1 while the communication processing with the roadside device 1 is not yet completed can be reduced.

It is preferable that the strength threshold applied when the reception strength tends to decrease is set to a sufficient reception strength so that the communication processing can be completed while the host vehicle V is staying in the wireless communication area of the roadside device 1. As described above, the strength threshold applied when the reception strength tends to increase may be set to a decoding limit value or the like as described above.

As still another embodiment, when the reception strength of the WSA corresponding to the service selected by the service selection unit 31D is decreasing, the communication availability determination unit 31E may determine that the WAVE communication cannot be performed with the roadside device 1.

Second Modification

In the above description, the WSA includes the assumed traffic and the vehicle side device 3 acquires the assumed traffic of the service corresponding to the received WSA by referring to the assumed traffic of the received WSA. However, the present disclosure is not limited to such a configuration. The vehicle side device 3 may have data indicating the assumed traffic for each PSID in the storage 313 and acquire the assumed traffic of the service corresponding to the received WSA based on the data. In that case, the WSA need not contain information indicating the assumed traffic.

Third Modification

In the above description, the service selection unit 31D selects a service having a large assumed traffic with a higher priority from the unprocessed services registered in the service list, but the present disclosure is not limited to such a configuration. Alternatively, an administrator or the like of the mobile object communication system 100 may select a service to be used according to the priority set for each PSID. In this case, the priority is a parameter indicating the degree that is a service to be used preferentially.

When the multiple services become available, the service selection unit 31D may select the service with the highest priority as the service to be used from the multiple available services. Data indicating the priority for each PSID may be registered in the storage 313 or the like. Further, the information indicating the priority of the service may be included in the WSA.

Fourth Modification

In the foregoing, the communication availability determination unit 31E determines whether the WAVE communication can be performed with the roadside device 1 that provides the service selected by the service selection unit 31D, or not, based on the reception strength of the WSA. However, the present disclosure is not limited to such a configuration. In the case where the vehicle side device 3 is configured so as to acquire the current position of the host vehicle V and the position of the roadside device 1, it may be determined whether the WAVE communication can be performed with the roadside device 1, or not, based on the positional relationship (for example, distance) between the host vehicle V and the roadside device 1.

For example, a communication limit distance corresponding to a limit value of the WAVE communicable distance is set in advance, and if the distance between the host vehicle V and the roadside device 1 is equal to or larger than the communication limit distance, it may be determined that the WAVE communication cannot be performed with the roadside device 1. Further, if the distance between the host vehicle V and the roadside device 1 is smaller than the communication limit distance, it may be determined that the WAVE communication can be performed.

As a configuration for the vehicle side device 3 to acquire the current position of the host vehicle V, for example, the vehicle side device 3 may be provided with a GNSS receiver. The GNSS receiver is a device that sequentially detects the current position of the vehicle side device 3 (for example, every 100 milliseconds) upon receiving radio waves from a satellite used in the Global Navigation Satellite System (GNSS).

As the position of the roadside device 1, map data including the position of the roadside device 1 may be stored in the storage 313, or the position of the roadside device 1 may be externally obtainable through the wide area communication network. According to the configuration described above, the vehicle side device 3 can acquire the position of the roadside device 1. In addition, information indicating the position of the roadside device 1 may be included in the WSA.

Fifth Modification

In the above description, the vehicle side device 3 includes the vehicle side wide area communication unit 33 and the vehicle side device 3 accesses the wide area communication network 4 by the vehicle side wide area communication unit 33. However, the present disclosure is not limited to such a configuration. For example, as a configuration of the vehicle side device 3, a mode in which an in-vehicle communication unit that communicates with a mobile terminal such as a smartphone which is brought into the vehicle V by a user is provided is also assumed.

In such a configuration, the vehicle side device 3 may access the wide area communication network 4 through a mobile terminal in cooperation with the mobile terminal communicatively connected to the vehicle side device 3 through the in-vehicle communication unit.

It should be noted that the mobile terminal in this case may be provided with a function of performing a wide area communication and a function of communicating with the vehicle side device 3. For example, a cellular phone such as a smartphone, a tablet device, a wearable device, a portable music player, a portable game machine, and the like can be used as the mobile terminal described above.

The mode of the communication connection between the vehicle side device 3 and the mobile terminal may be wired connection or wireless connection. Bluetooth or the like can be employed as a communication standard when the vehicle side device 3 and the mobile terminal are wirelessly connected to each other. Bluetooth is a registered trademark of Bluetooth SIG, Inc.

Sixth Modification

Figure 16:
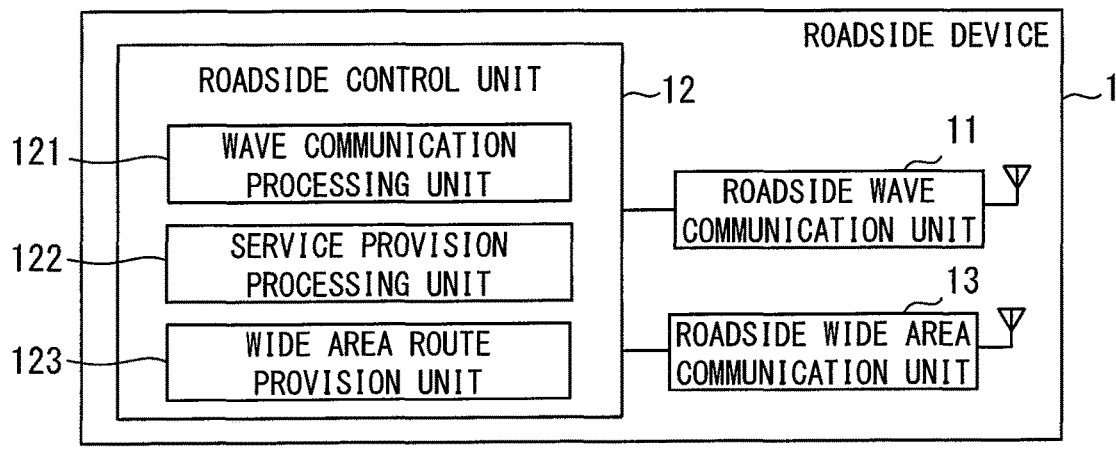
FIG. 16 is a diagram illustrating an example of a schematic configuration of a roadside device according to a sixth modification of the present disclosure.

In the foregoing, the center 2 provides the service to the vehicle side device 3 by the wide area communication. However, the present disclosure is not limited to such a configuration. As shown in FIG. 16, the roadside device 1 may be provided with the roadside wide area communication unit 13 that performs the wide area communication, and the roadside device 1 may provide a service to the vehicle side device 3 by the wide area communication.

In other words, the function corresponding to the wide area route provision unit 221 may be provided in the roadside device 1. The wide area route provision unit 123 shown in FIG. 16 corresponds to the wide area route provision unit 221 provided in the center 2 in the embodiment described above. The wide area route provision unit 123 may be realized by causing the CPU provided in the roadside device 1 to execute the roadside device program, or may be realized by hardware with the use of one or multiple ICs. According to the configuration of the sixth modification, the mobile object communication system 100 need not have the center 2.

Seventh Modification

In the above description, a mode in which the vehicle side device 3 performs the communication with the roadside device 1 according to the WAVE standard is assumed. However, a communication partner of the roadside device 1 is not limited to the vehicle side device 3. The communication partner of the roadside device 1 may be a mobile terminal carried by a pedestrian.

In this case, the mobile terminal may have the same function as that of the vehicle side device 3 described above. The vehicle side device 3 and the mobile terminal correspond to a mobile object side device. Also, the vehicles and the pedestrians correspond to mobile objects.

Eighth Modification

In the embodiments described above, the roadside device 1 is shown as an example of the service provision device, but the service provision device is not limited to the roadside device 1. The service provision device may be a communication terminal carried by a pedestrian.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

What is claimed is:

1. A mobile object communication system comprising:
a mobile object side device used in a mobile object;
a service provision device that performs a short range wireless communication with the mobile object side device to provide a predetermined service to the mobile object side device, wherein the short range wireless communication adopts one of a plurality of types of service channels preliminarily allocated for provision of services by the service provision device and a control channel that is a communication channel different from all of the plurality of service channels and used for a connection control of the short range wireless communication, and the predetermined service is one of the services provided by the service provision device; and
a wide area route provision unit that provides each of the services provided by the service provision device by performing a communication through a wide area communication network in response to a request from the mobile object side device,
wherein
the service provision device sequentially transmits, using the control channel, service start information that notifies each of the services provided by the service provision device,
the mobile object side device includes:
a mobile object side wide area communication unit that performs the communication through the wide area communication network;
a mobile object side short range communication unit that performs the short range wireless communication with the service provision device and receives the service start information transmitted from the service provision device;
an unprocessed service management unit that holds, as unprocessed services, one or more of the services which is not yet used among the services notified by the service start information, wherein the service start information is received by the mobile object side short range communication unit;
a service selection unit that selects a service to be used from the unprocessed services held by the unprocessed service management unit; and
a communication availability determination unit that determines whether the short range wireless communication can be performed with the service provision device that provides the service selected by the service selection unit, and
when the communication availability determination unit determines that the short range wireless communication cannot be performed with the service provision device providing the service selected by the service selection unit, the mobile object side device uses the service selected by the service selection unit by controlling the mobile object side wide area communication unit to perform the communication through the wide area communication network with the wide area route provision unit.

2. The mobile object communication system according to claim 1, wherein
the mobile object side device further includes a reception strength acquisition unit that acquires a reception strength of a signal corresponding to the service start information received by the mobile object side short range communication unit,
the unprocessed service management unit holds the reception strength, which is acquired by the reception strength acquisition unit from the service start information, in association with one of the services indicated by the service start information, and
the communication availability determination unit determines, based on the reception strength associated with the service selected by the service selection unit, whether the short range wireless communication can be performed with the service provision device that provides the service selected by the service selection unit.

3. The mobile object communication system according to claim 1, wherein
the unprocessed service management unit acquires an assumed traffic which is an assumed value of a data traffic occurring when using each of the services, and
the service selection unit selects, with a higher priority, a service having a larger assumed traffic than others as the service to be used.

4. The mobile object communication system according to claim 1, wherein,
when the mobile object side short range communication unit receives the service start information in a state where the unprocessed service management unit does not hold the unprocessed services,
the mobile object side short range communication unit continues a state where the control channel is set as a transmission and reception channel for a service collection duration which is defined as a predetermined time period from a time of receiving the service start information to a time of receiving another information on another service, and
the service selection unit selects the service to be used based on one or more service start information received during the service collection duration.

5. A mobile object side device employed in a mobile object communication system, wherein
the mobile object communication system includes:
the mobile object side device used in a mobile object;
a service provision device that performs a short range wireless communication with the mobile object side device to provide a predetermined service to the mobile object side device, wherein the short range wireless communication adopts one of a plurality of types of service channels preliminarily allocated for provision of services by the service provision device and a control channel that is a communication channel different from all of the plurality of service channels and used for a connection control of the short range wireless communication, and the predetermined service is one of the services provided by the service provision device; and
a wide area route provision unit that provides each of the services provided by the service provision device by performing a communication through a wide area communication network in response to a request from the mobile object side device, and
the service provision device sequentially transmits, using the control channel, service start information that notifies each of the services provided by the service provision device,
the mobile object side device comprising:
a mobile object side wide area communication unit that performs the communication through the wide area communication network;
a mobile object side short range communication unit that performs the short range wireless communication with the service provision device and receives the service start information transmitted from the service provision device;
an unprocessed service management unit that holds, as unprocessed services, one or more of the services which is not yet used among the services notified by the service start information, wherein the service start information is received by the mobile object side short range communication unit;
a service selection unit that selects a service to be used from the unprocessed services held by the unprocessed service management unit; and
a communication availability determination unit that determines whether the short range wireless communication can be performed with the service provision device that provides the service selected by the service selection unit,
wherein, when the communication availability determination unit determines that the short range wireless communication cannot be performed with the service provision device providing the service selected by the service selection unit, the mobile object side device uses the service selected by the service selection unit by controlling the mobile object side wide area communication unit to perform the communication through the wide area communication network with the wide area route provision unit.

* * * * *